US006101288A

United States Patent [19]
Kang

[11] Patent Number: 6,101,288
[45] Date of Patent: Aug. 8, 2000

[54] METHOD FOR RECOVERING RADIAL DISTORTION PARAMETERS FROM A SINGLE CAMERA IMAGE

[75] Inventor: Sing Bing Kang, Cambridge, Mass.

[73] Assignee: Digital Equipment Corporation, Maynard, Mass.

[21] Appl. No.: 08/901,689

[22] Filed: Jul. 28, 1997

[51] Int. Cl.[7] ........................................ G06K 9/36
[52] U.S. Cl. ............................ 382/276; 382/275
[58] Field of Search ...................... 382/293, 295, 382/296, 276, 154, 275; 348/207

[56] References Cited

U.S. PATENT DOCUMENTS

| | | | |
|---|---|---|---|
| 4,688,092 | 8/1987 | Kamel et al. ............................ | 358/109 |
| 5,047,968 | 9/1991 | Carrington et al. ..................... | 364/574 |
| 5,642,293 | 6/1997 | Manthey et al. ........................ | 382/285 |
| 5,675,380 | 10/1997 | Florent et al. .......................... | 348/251 |
| 5,796,426 | 8/1998 | Gullichsen et al. .................... | 382/293 |

OTHER PUBLICATIONS

Brown, Duane C., "Close–Range Camera Calibration," Journal of the American Society of Photogrammetry, vol. 37, No. 8, Aug. 1971.

Tsai, R.Y., "A Versatile Camera Calibration Technique for High–Accuracy 3D Machine Vision Metrology Using Off–theShelf TV Cameras and Lenses," IEEE Journal of Robotics and Automation, vo. RA–3, No. 4, Aug. 1987.

Kass et al., "Snakes: Active Controu Models," Ist IJCV, Jun. 8–11, 1987, London, England; IEEE 1987.

Stein G., "Lens Distortion Calibration using Point Correspondences," MIT Artificial Intelligence Lab, A.I. Memo No. 1595, Nov. 1996.

*Primary Examiner*—Yon J. Couso
*Attorney, Agent, or Firm*—Cesari & McKenna, LLP

[57] ABSTRACT

In a computerized method, a set of radial distortion parameters are recovered from a single image by selecting arbitrarily oriented straight lines in a single image using an input device. Then, objective functions in Cartesian form are minimized using a least-squares fit formulation to recover the set of radial distortion parameters.

4 Claims, 7 Drawing Sheets

METHOD FOR RECOVERING RADIAL DISTORTION PARAMETERS FROM A SINGLE CAMERA IMAGE

FIELD OF THE INVENTION

The invention relates generally to the field of computerized image processing, and more particularly to processing non-linearly distorted images.

BACKGROUND OF THE INVENTION

Computerized image processing applications that require 3-D modeling of large scenes, or image compositing of a large scene typically use images acquired by cameras with wide fields of view. Images taken with cameras having wide fields of view suffer from non-linear distortions due to simplified lens construction and lens imperfections. In such images, distortion effects can be removed by calibrating the camera and subsequently undistorting the input image. Distortion can also be present in images taken through other types of lenses.

In general, there are two forms of distortion, namely radial distortion and tangential distortion. In many cases, the recovery of camera parameters is disconnected from the process which detects distorted features in an image. Although this does not present a problem when feature detection is correct, directly linking the feature detection to parameter estimation can result in a more robust recovery, especially in the presence of noise.

There has been significant work done on camera calibration, but many known methods require taking images of specific calibration patterns with exactly known dimensions. There is a class of work done on calibrating the camera using the scene image or images themselves, and possibly taking advantage of special structures such as straight lines, parallel straight lines, perpendicular lines, and so forth.

In one prior art method, a minimum vanishing point dispersion constraint is used to estimate both radial and tangential (decentering) lens distortion. However, there the user has to manually group parallel "calibration" lines together.

In another known method, a number of parallel plumb lines are used to compute the radial distortion parameters using an iterative gradient-descent technique involving a first order Taylor's expansion of a line fit function. Points on the parallel plumb lines are manually extracted. Such a process can be time consuming; for example, measuring 162 points from horizontal lines and 162 points from vertical lines may take several hours.

Another method uses point correspondences between multiple views to extract radial distortion coefficients. There, epipolar and tri-linear constraints are used, and a search is performed for the amount of radial distortion that minimizes the errors in these constraints.

Photogrammetry methods usually rely on using known calibration points or structures, for example, using plumb lines to recover distortion parameters, or corners of regularly spaced boxes of known dimensions for full camera calibration. A more flexible known arrangement requires that all points used for the calibration are coplanar, and that there are identified horizontal and vertical points among the calibration points. Projective invariants can also be used to recover radial distortion coefficients.

In other image processing applications unrelated to distortion correction, such as the tracking of human facial features, and the reconstruction of objects using cells, active deformable contours, or "snakes" have been used to outline features in images. The various forms of snakes include the notion of "inflating contour" to reduce sensitivity to initialization at the expense of an increased number parameters, or using an "active contour." In these methods, the snakes, some of which may be parameterized, are generally independent of each other. It would be advantageous to recover distortion parameters ($\kappa$) from a single image without prior knowledge of the camera parameters. It would also be a further advantage when the recovery can be done directly from any image.

SUMMARY OF THE INVENTION

Provided is a computerized method for recovering a set of radial distortion parameters from a single image taken by a camera. Arbitrarily oriented straight lines in a single image are selected using an input device, for example, a mouse or a keyboard.

Lines closer to horizontal are rotated to be horizontal, and lines closer to vertical are rotated to be vertical. The lines are rotated about a principle point in the image. Objective functions describing the rotated lines are minimized using a least-squares fit formulation to recover the set of radial distortion parameters.

In one aspect of the invention, the lines are selected by a plurality of discrete points. In another aspect of the invention, the lines are selected by drawn "snakes," or deformable contours.

Prior to selecting the lines, the image can be blurred. Blurring improves the detection of high contrast edges to which the snakes are moved. During the minimization, the snakes can move independent or dependent of each other, and the magnitude of the movement of the snakes can be proportional to a local intensity gradient of a nearest detected edge.

DETAILED DESCRIPTION OF A PREFERRED EMBODIMENT

System Overview

Figure 1:
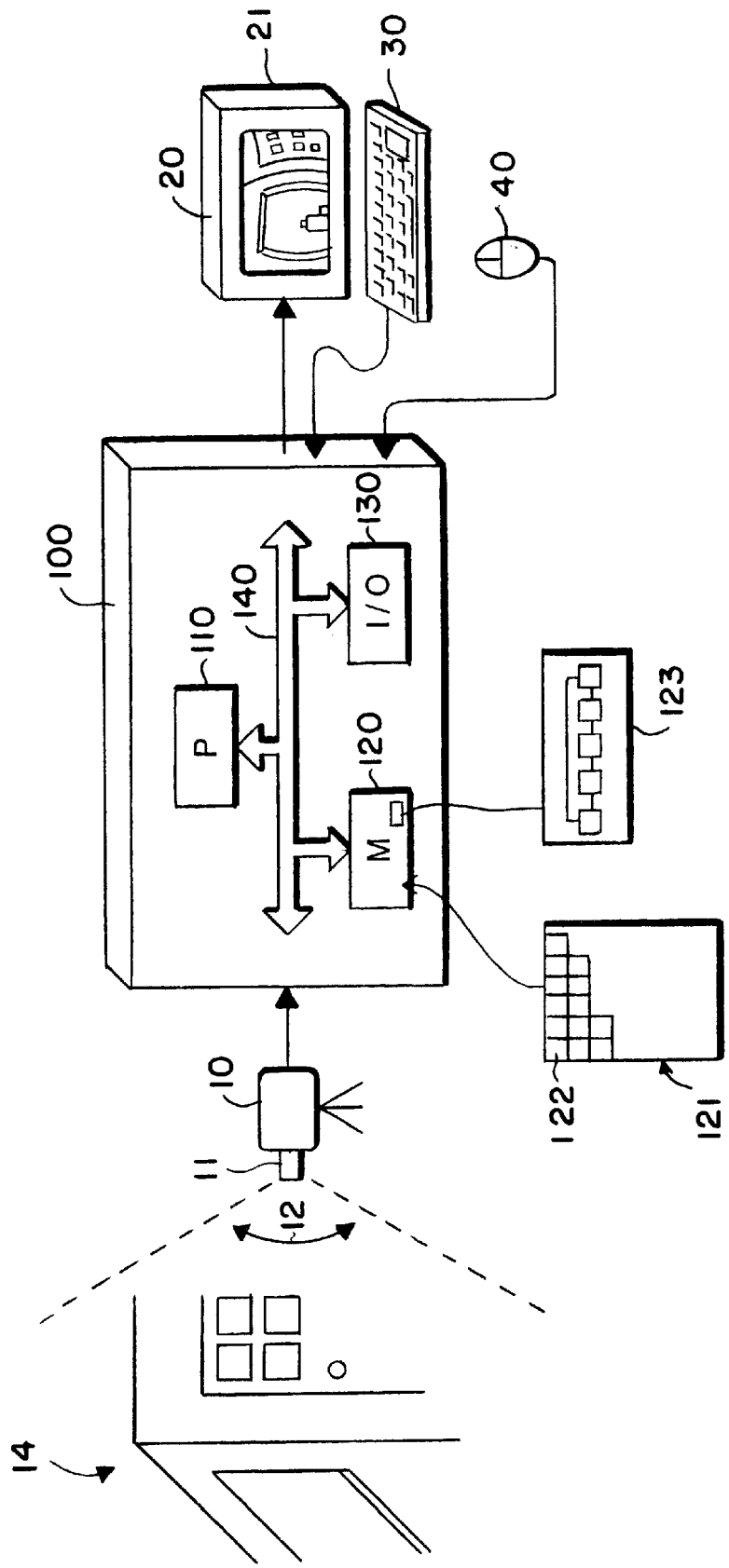
FIG. 1 is a block diagram of a computer system which can use the distortion recovery method of the present invention.

FIG. 1 shows a computer system 100 connected to a camera 10 having a lens 11. The computer system 100 is also connected to a display device 20, a keyboard 30, and a mouse 40. When the camera is to acquire images of a large scene, the field of view of the lens will be wide leading to distorted images. However, other types of lenses may also produce distorted images which can be corrected as disclosed herein.

The system 100 includes one or more processors (P) 110, memories (M) 120, input/output interfaces (I/O) 130 connected to each other by bus lines 140.

During operation of the system 100, a single image of a scene 14 is acquired by the camera 10. For example, the scene 14 is a view of a corner of an office having a black board on one wall, and a door in an adjacent wall. The image is stored in the memories 120 of the system 100 as a single digitized frame 121. Typically, the frame 121 includes a plurality of pixels 122 arranged in a regular pattern. The pixels 122 encode measured color or grey-level values representative of the scene 14 imaged by the camera 10.

Computerized processes 123, described in greater detail below, are also stored in the memories 120 as instructions and data of software programs written in, for example, the C language. The programs operate under the control of an operating system, for example, UNIX (tm). The instructions of the programs manipulate the pixel data to recover radial distortion parameters due to lens construction. The distortion parameters can be used to correct the distorted image.

The processes 123 are interactively initiated by a user of the system 100. The user operates the processes 123 with the keyboard 30 and/or the mouse 40 while viewing a projected image 21 on the display device 20.

Introduction

As a brief introduction, three interactive methods are presented. In these three methods, the user selects, using for example the mouse 40, arbitrarily oriented straight lines in the projected distorted image 21. A first method is the most direct: manually chosen discrete points on straight lines are used to compute the radial distortion parameters. The second and third methods allow the user to draw "snakes" on the image. Each snake approximately corresponds to the projected lines. The snakes are drawn along strong, i.e., high contrast, edges subject to regularization.

The difference between the second and third method is the behavior of the snakes. In the second method, the snakes behave like independent snakes as have been used in other unrelated image processing applications, e.g., facial feature tracking, and object reconstruction. In the third method, the behavior of the snakes is globally connected via a consistent model of radial distortion. Therefore, these snakes are called radial distortion snakes.

Experimental results show that the third method which uses radial distortion snakes is the most robust and accurate. This can be attributed to the direct link of edge fitting to the radial distortion parameters. In the simpler first and second methods, the process of locating edges is done independent of radial distortion parameter estimation.

Lens Distortion

Before detailing the three interactive calibration methods, a model for describing lens distortion is described. In essence, there are two kinds of lens distortion, namely radial and tangential (or decentering) distortion. Each kind of distortion can be represented by an infinite series, but generally, a small number is adequate. In general, the model used herein is the same as the model for radial distortion which has been adopted by the U.S. Geological Survey.

It is well known that lens distortion can generally be expressed as:

$$x_u = x_d + X_d \sum_{l=1}^{\infty} \kappa_l R_d^l + [P_1(R_d + 2X_d^2) + 2P_2 X_d Y_d]\left[1 + \sum_{t=1}^{\infty} P_{l+2} R_d^l\right]$$

$$y_u = y_d + Y_d \sum_{l=1}^{\infty} \kappa_l R_d^l + [2P_1 X_d Y_d + 2P(R_d + 2Y_d^2)]\left[1 + \sum_{t=1}^{\infty} P_{l+2} R_d^l\right]$$

where $(x_u, y_u)$ is the theoretical undistorted image point location, $(x_d, y_d)$ is the measured distorted image point location, $X_d = x_d - x_p$, $Y_d = y_d - y_p$, $(x_p, y_p)$ is the principle point, and $R_d = X_d^2 + Y_d^2$. The principle point is where the optical axis of the camera intersects the image plane.

Accordingly, in the preferred embodiment, the value of $(x_d, y_d)$ is equated to center of the image, and decentering distortion coefficients are assumed to be zero, i.e., $P_1 = P_2 = \ldots = 0$. This reduces the series expansions for $(x_u, y_u)$ to:

$$x_u = x_d + x_d \sum_{t=1}^{\infty} \kappa_l R_d^l, \; y_u = y_d + y_d \sum_{t=1}^{\infty} \kappa_l R_d^l \quad [\text{Eq 1}]$$

In the calibration methods, each of which using only a single image, the user first indicates the locations of projected straight lines in the scene; the radial distortion parameters are then automatically determined.

Method 1: Using User-Specified Points

The first method comprises two stages: a stage where the user selects points on arbitrarily oriented straight lines by clicking directly on the projected image using the mouse 40, and another stage where the camera radial distortion parameters are determined using a least-squares formulation.

Figure 2:
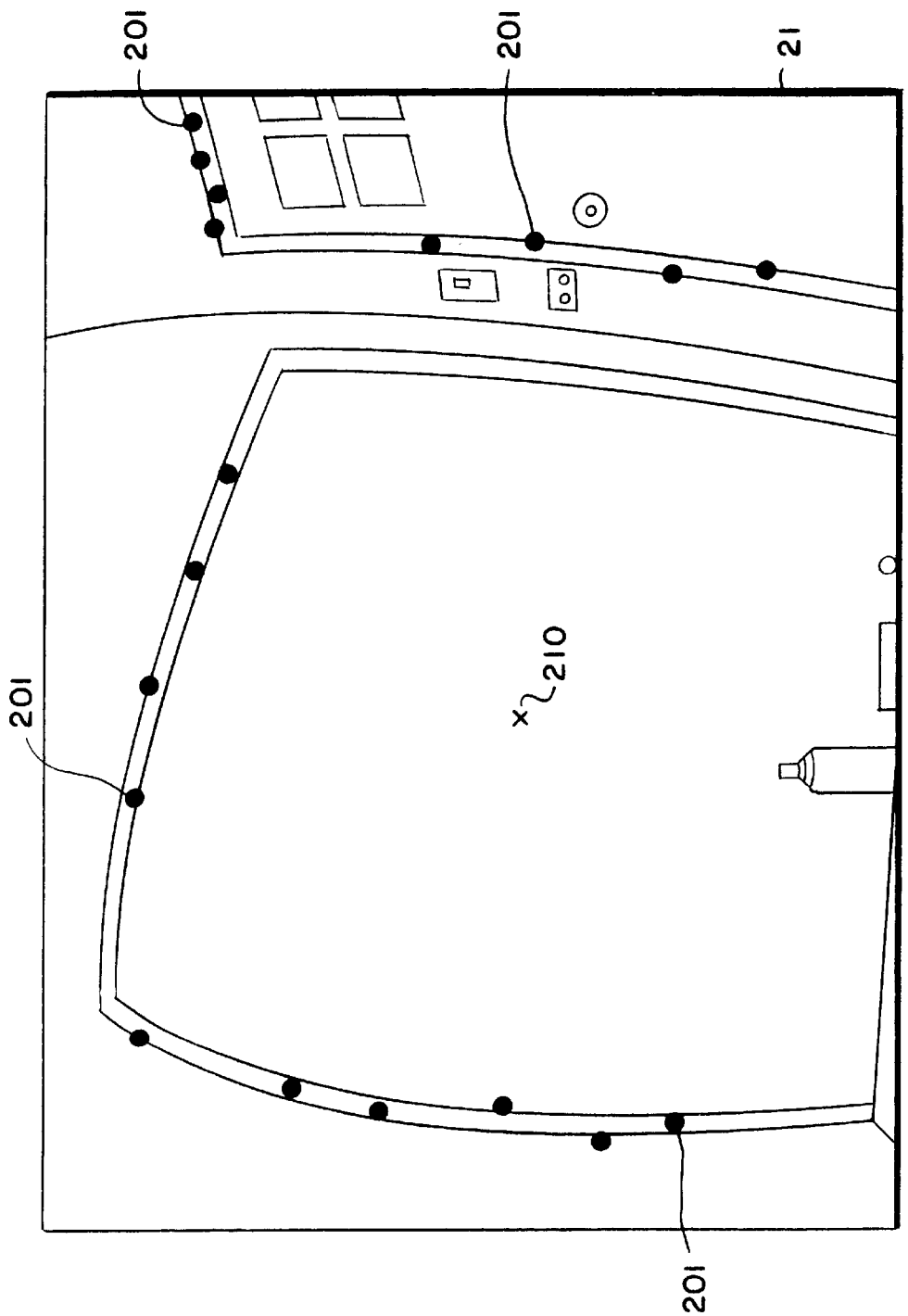
FIG. 2 is a diagram of a distorted image with selection points.

As shown in FIG. 2, the projected view 21 of the scene 14 has a substantial amount of radial distortion due to the wide field of view of the lens 11. The principle point 210 in the projected image 21 is marked with the symbol "x." The user selects multiple points 201 along arbitrarily oriented lines known to be straight, for example, the blackboard molding and the door frame. The points 201 can be selected by clicking the mouse 40 or the cursor keys of the keyboard 30.

Figure 3:
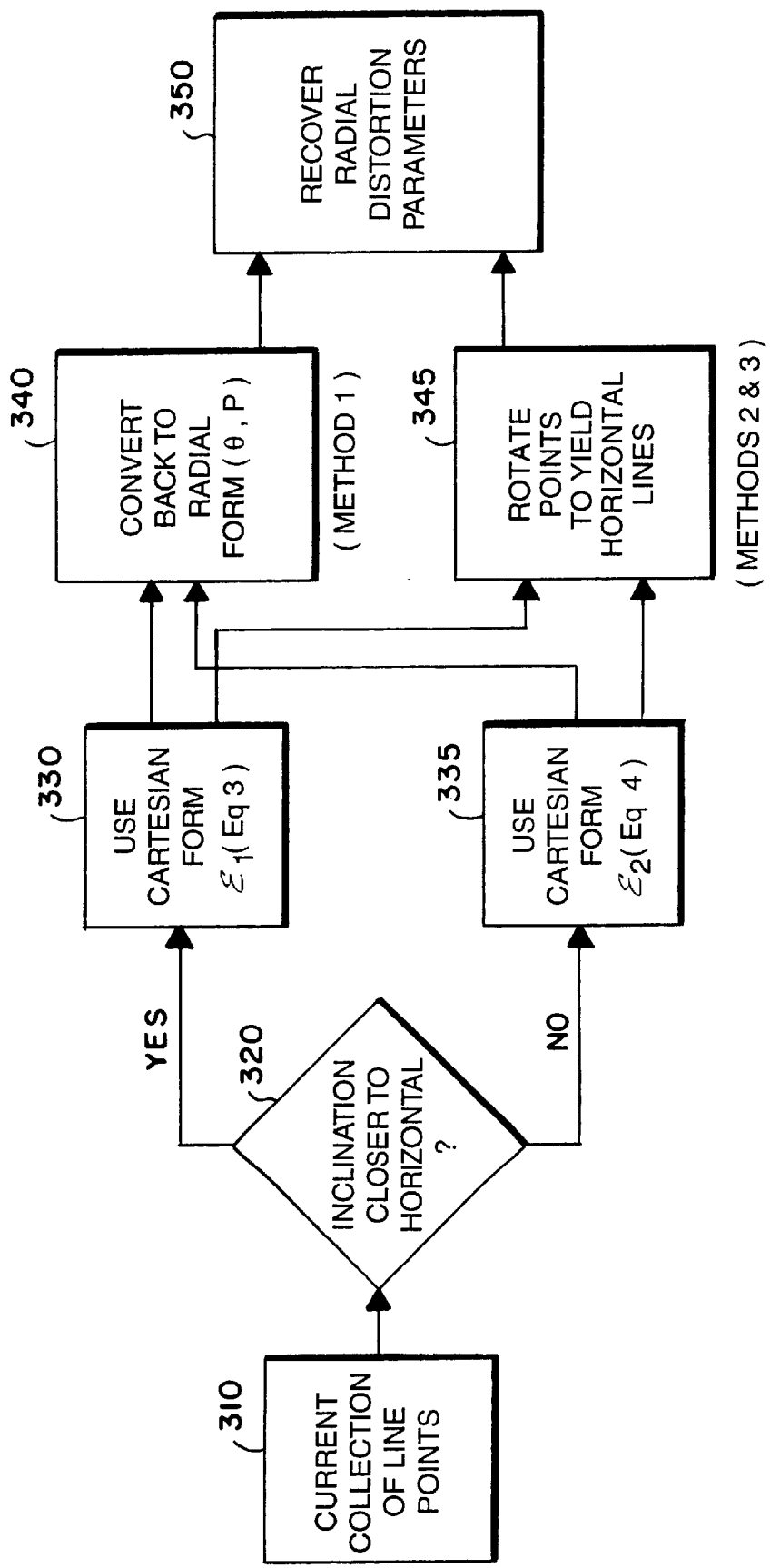
FIG. 3 is a flow diagram of a process for recovering radial distortion parameters according to a preferred embodiment of the invention.

After the lines have been selected in step 310 as shown in FIG. 3, the non-linear radial distortion parameters are recovered by minimizing an objective function:

$$\varepsilon = \sum_{i=1}^{N_l} \sum_{j=1}^{N_{p,i}} \left[(\cos\theta_i x_{ij} + \sin\theta_i y_{ij})\left(1 + \sum_{l=1}^{L} \kappa_l R_{ij}^l\right) - \rho_i\right]^2 \quad [\text{Eq 2}]$$

where $(x_{ij}, y_{ij})$ are the coordinates of points in the distorted input image, N is the distorted input image, $N_l$ is the number of lines, $N_{p,i}$ is the number of points selected in line i, $(\theta_i, \rho_i)$ is the parametric line representation for line i, L is the number of radial distortion parameters to the extracted, and $R_{ij} = x_{ij}^2 + y_{ij}^2$.

To get a closed form solution, the objective function is recast in Cartesian form:

$$\varepsilon_1 = \sum_{i=1}^{N_l} \sum_{j=1}^{N_{p,i}} \left[y_{ij} - m_i x_{ij} - \frac{c_i}{1 + \sum_{l=1}^{L} \kappa_l R_{ij}^l}\right]^2 \quad [\text{Eq 3}]$$

for lines whose inclinations are closer to the horizontal axis (330), and as:

$$\varepsilon_2 = \sum_{i=1}^{N_l} \sum_{j=1}^{N_{p,i}} \left[ x_{ij} - m'_i y_{ij} - \frac{c'_i}{1 + \sum_{l=1}^{L} \kappa_l R^l_{ij}} \right]^2 \quad \text{[Eq 4]}$$

for lines whose inclinations are closer to the vertical axis (335). The choice between $\varepsilon_1$ and $\varepsilon_2$ is made based on the slope of the best fit line through the set selection points (320).

Step 330 takes the partials of the recast objective functions to yield values for parameters $m_n$, $c_n$, and $S_n(f)$ for lines closer to being horizontal, and parameters $m'_n$, $c'_n$, for lines closer to being vertical in step 335. The $(m_n, c_n,)$ and $(m'_n, c'_n)$ representation can be converted back to the radial form, e.g., $(\theta_n, \rho_n)$ of the objective function Eq 2 in step 340, from which the $\kappa_1$'s can directly be recovered in step 350. Step 350 is described in greater detail below for Method 3 where the $(\theta_i, \rho_i)$'s are known. The $\kappa_1$'s can be found by solving a set of simultaneous linear equations:

$$\sum_{l=1}^{L} \kappa_l G_{m+1} = H_m - G_m \quad \text{[Eq 5]}$$

with $m = 1, \ldots, L$, and $$G_m = \sum_{i=1}^{N_l} \sum_{j=1}^{N_{p,i}} g_{ij}^2 R_{ij}^m \quad \text{[Eq 6]}$$

$$H_m = \sum_{i=1}^{N_l} \rho_i \sum_{j=1}^{N_{p,i}} g_{ij} R_{ij}^m \quad \text{[Eq 7]}$$

$$g_{ij} = \cos\theta_i x_{ij} + \sin\theta_i y_{ij} \quad \text{[Eq 8]}$$

For the special case of estimating only one radial distortion coefficient, i.e., L=1:

$$\kappa_1 = \frac{H_1 - G_1}{G_2} \quad \text{[Eq 8]}$$

For the case of two radial distortion coefficients, i.e., L=2:

$$\begin{pmatrix} \kappa_1 \\ \kappa_2 \end{pmatrix} = \begin{pmatrix} G_2 G_3 \\ G_3 G_4 \end{pmatrix}^{-1} \begin{pmatrix} (H_1 - G_1) \\ (H_2 - G_2) \end{pmatrix} \quad \text{[Eq 9]}$$

Although Method 1 requires a manual selection of individual points, which may be tedious, the extracted radial distortion parameters $\kappa_i$ can be reliable when multiple points are carefully chosen.

Figure 4:
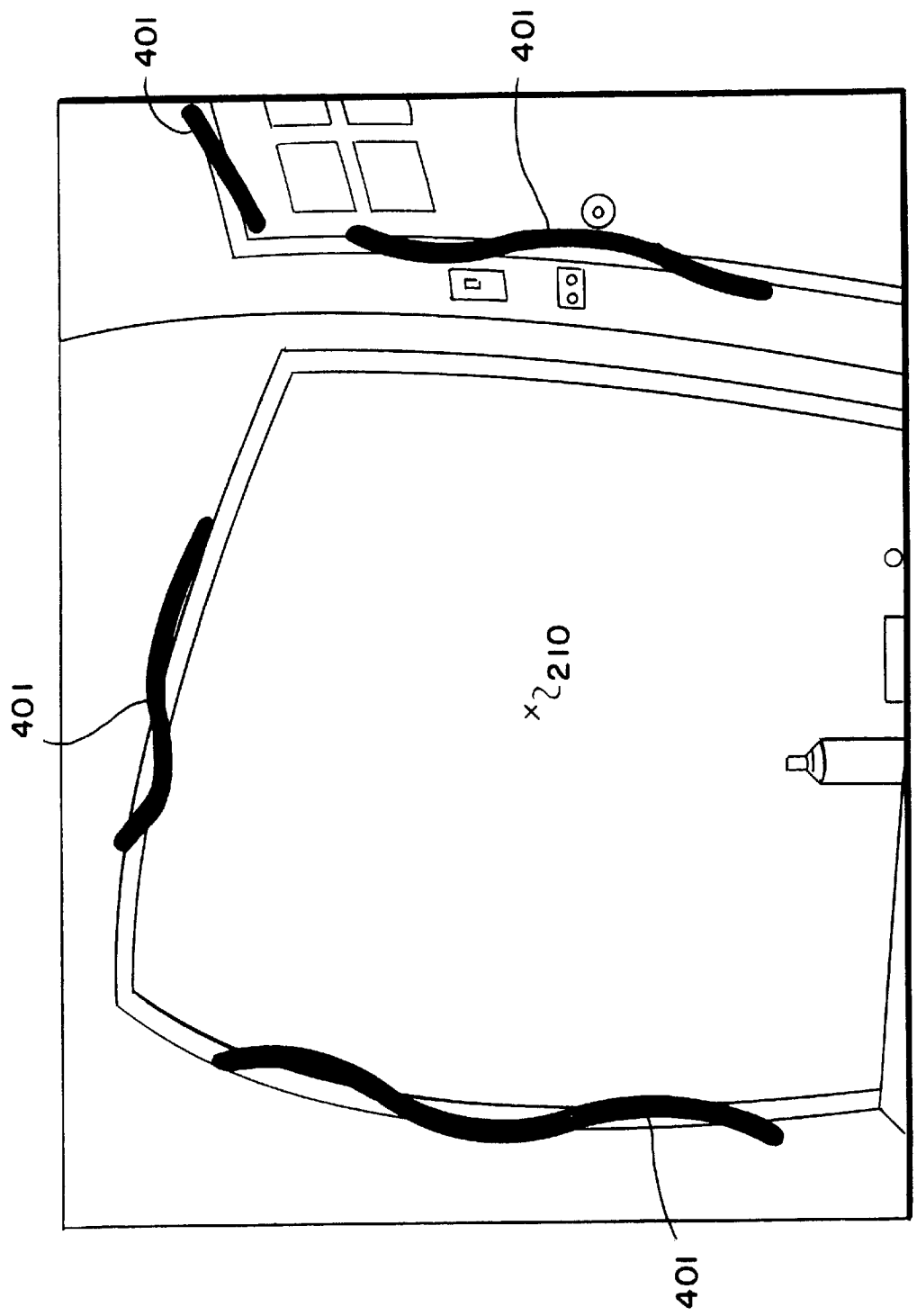
FIG. 4 is a diagram of the distorted image with selection snakes.

In Method 2 and Method 3, as shown in FIG. 4, the mouse 40 is used to "follow" or draw curves (snakes) 401 over what are known to be projected straight lines. Better results can be obtained when the projected straight lines being followed have strong or high contrast edges. As an advantage over Method 1, here the snakes 401 do not need to be carefully drawn to follow the selected horizontal and vertical lines.

After the snakes have been drawn, Method 2 method reshapes the snakes to follow or "stick to" the edges. The radial distortion parameters are then based on the final configuration of the snakes. The difference between Methods 2 and 3 is in the behavior of the snakes 401. In Method 2 the snakes move independently, and in Method 3 the snakes 401 move in a globally dependent manner.

Figure 5:
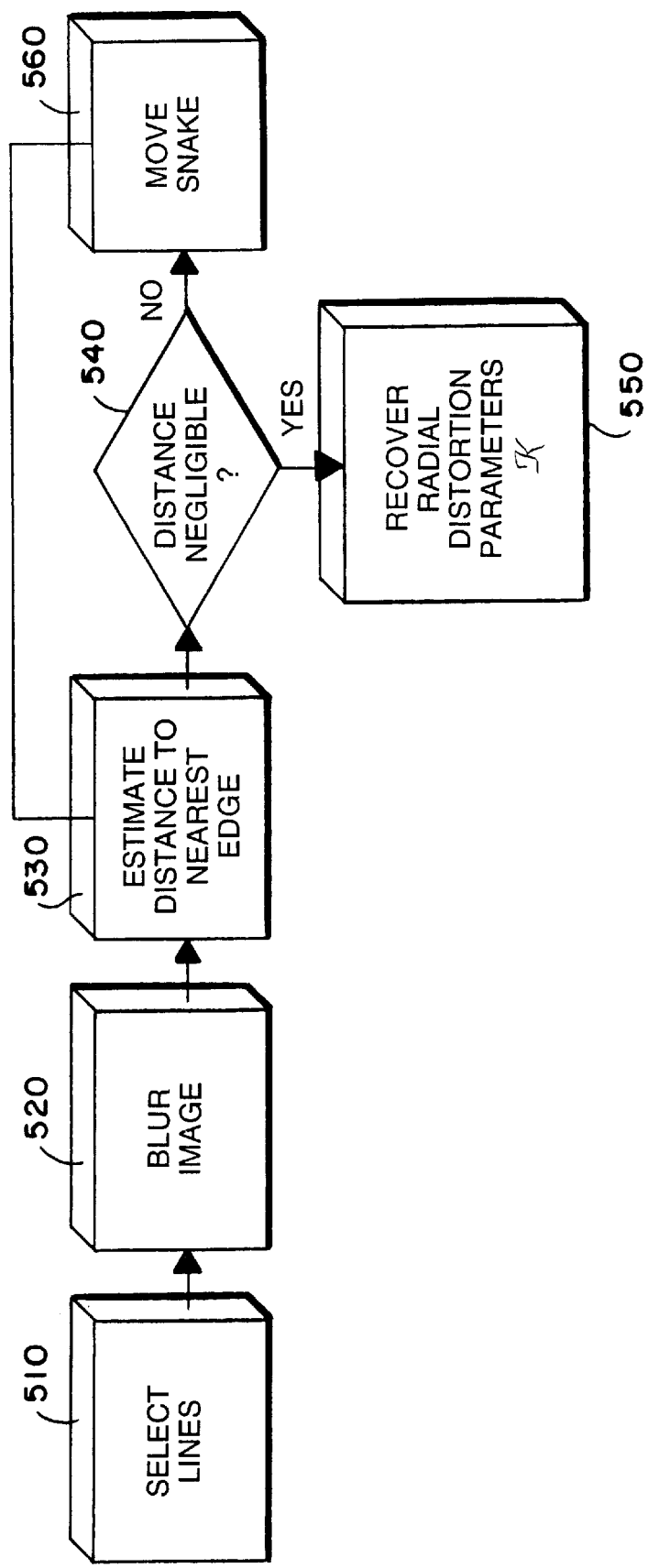
FIG. 5 is a flow diagram of a process for recovering parameters using two types of snakes.

As shown in FIG. 5 for the both Method 2 and Method 3, arbitrarily oriented straight lines are selected in step 510.

The input image 121 is blurred in step 520 to remove high frequency changes which may prevent a snake from being attracted to a strong edge when the edge is sufficiently far away from the initial snake configuration specified by the user. This step is also performed for Method 3.

Method 2: Using Independent Snakes

In Method 2, the motion of the snakes from their initial to final configuration is based on two factors: motion smoothness (due to external forces), and spatial smoothness (due to internal forces).

Given the original configuration of each snake 401, a point $p_j$ on the snake 401 incrementally moves towards a nearest detected edge, e.g., one of the selected horizontal or vertical lines. Therefore, in step 530 the nearest edge is detected and the snake is moved. The amount of incremental movement $\delta p_j$ is given by:

$$\delta p_j = (1 - \lambda) \sum_{k \in N_j} \mu_{jk} \delta p_{edge} + \lambda \sum_{k \in N_j} \mu_{jk} (p_k - p_j) \quad \text{[Eq 10]}$$

where $N_j$ are pixels at and in the neighborhood of point $p_j$. The value of $\delta p_{edge}$ is the determined motion of the ith point towards the nearest detectable edge. The magnitude of movement, unless close to zero, is generally inversely proportional to the local intensity gradient. If the motion is negligible as determined in step 540, then the distortion parameters are recovered in step 550 using the least-squares formulation as described for Method 1.

The values $\mu_{jk}$ are the weights of neighboring pixels. The value of $\kappa$ is set according to the emphasis on motion coherency and spatial smoothness. In the preferred implementation, the values of $N_j$ are all equal, and the radius of the neighborhood is five pixels. The weights $\mu_{jk}$ of the neighborhood points can be selected from a set $\{1, 2, 4, 8, 16, 32, 16, 8, 4, 2, 1\}$, with the weight 32 being the central point.

Note that a very simplistic version of snake movement is implemented here. The intent is to compare the effect of having snakes that operate independently of each other with snakes that act in a globally consistent manner, as described for Method 3 below, given the constraints of the types of curves that the snakes are collectively attempting to seek.

Method 3: Using Radial Distortion Snakes

Independent snakes may have the problem of getting stuck on incorrect local minima. This problem can be reduced by imposing more structure on the movement of the snakes, namely, making the shapes of the snakes consistent with the expected distortion of the selected lines, i.e., arc-like. For this reason, snakes which move in a dependent manner are called radial distortion snakes.

Ignoring asymmetric distortions due to tangential distortion and a non-unit aspect ratio, the complexity of the original objective function (Eq 2 above) can be reduced by considering the fact that the effect of radial distortion is rotationally invariant about the principal point.

Figure 6:
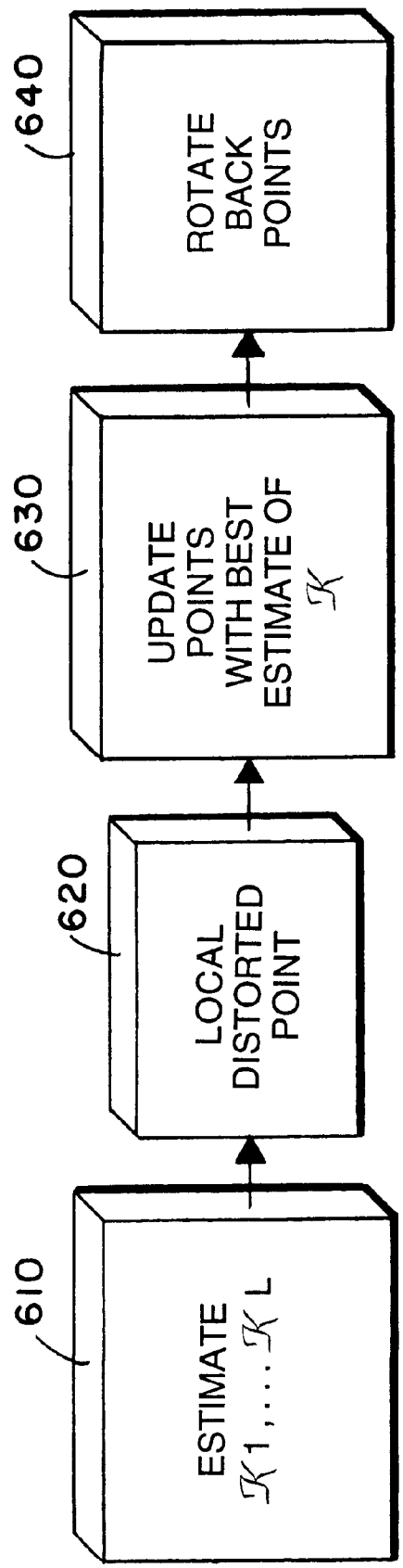
FIG. 6 is a flow diagram of a process of using estimated radial distortion parameters to move radial distortion snakes.

As shown in FIG. 6, Method 3 includes, after the lines have been selected and the image has been blurred, the following steps:

1) Rotate each snake so that the best fit line (using Eq 3 or 4) is horizontal (step 345). Let the angle of this rotation be $\alpha_i$ for the ith snake.

2) Estimate a best fit set of radial distortion parameters $\kappa_1, \ldots, \kappa_L$ from the rotated set of lines. The detail of step 610 are given in Appendix A attached hereto.

3) Find the expected rotated distorted point $p_j = (x_j, y_j)$ whose undistorted version lies on a horizontal line in step 620, i.e., $$y_j \left[1 + \sum_{l=1}^{L} \kappa_l (x_j^2 + y_j^2)^l\right] = h \quad [\text{Eq 11}]$$

Given initial points $(x_j^0, y_j^0)$ take $x_j = x_j^0$ and iteratively determine $y_j$ from:

$$y_j^{(k+1)} = \frac{h}{1 + \sum_{l=1}^{L} \kappa_l (x_j^2 + y_j^{(k)2})^l} \quad [\text{Eq 12}]$$

until the difference between successive values of $x_j^{(k)}$ is negligible.

4) Update points in step 630 using current best estimate of κ's and edge normal. In other words, the point $p_j$ is updated based on:

$$p_j^{new} \eta p_{kappa} + (1-\eta) p_j^{normal} \quad [\text{Eq13}]$$

with $0 \leq \eta \leq 1$, $p_j^{normal}$ is the expected new position of the snake point using Method 2 described above. For the ith snake, the value $p_j^{kappa}$ is obtained by rotating the value of $p_j$, as determined in the previous step, about the principal point by $-\alpha_i$ (step 640).

Figure 7:
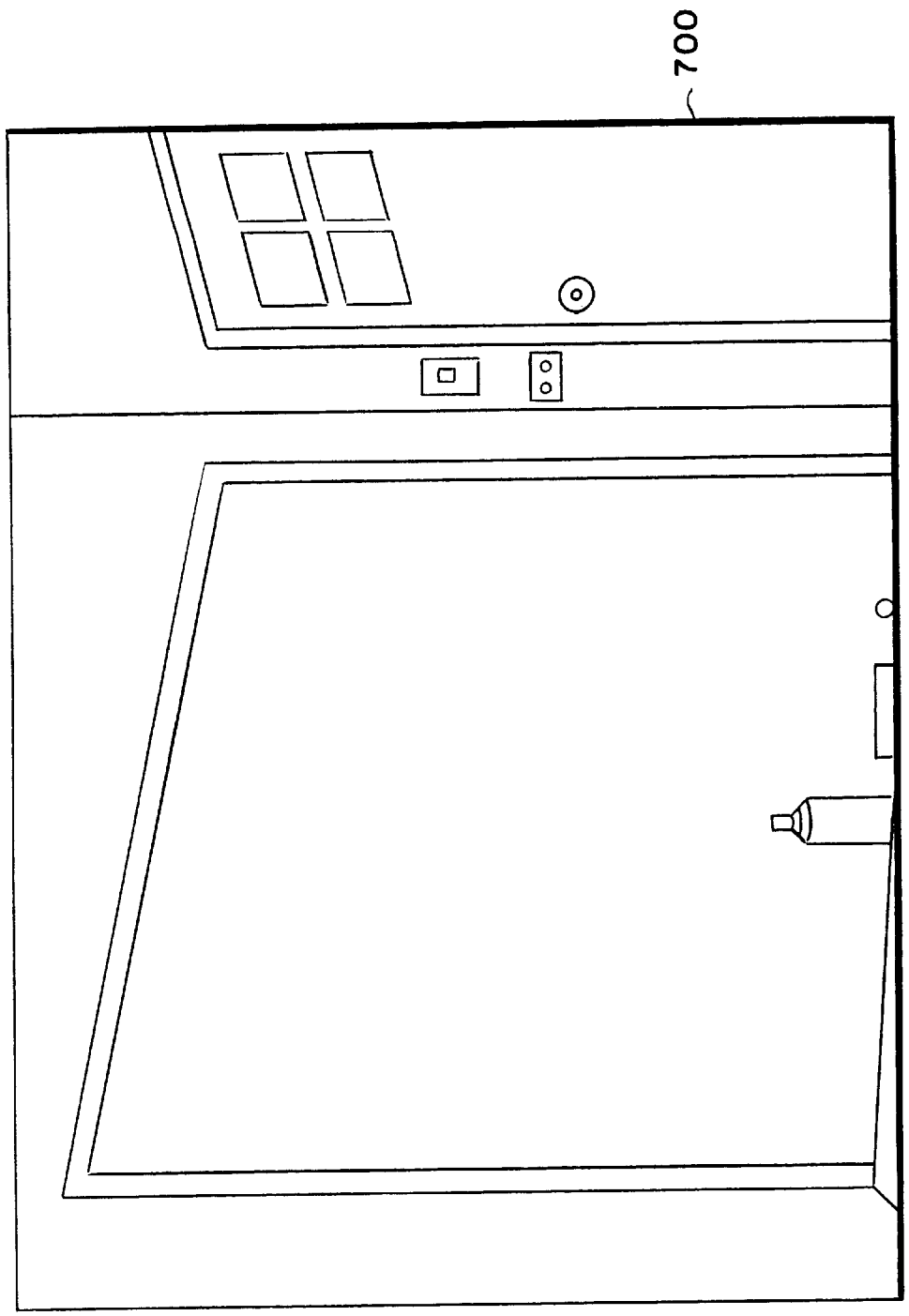
FIG. 7 is a diagram of a corrected image.

5) Iterate all the above steps until the overall mean change is negligible, or alternatively for a fixed number of iterations yielding an acceptable undistorted image 700 as shown in FIG. 7.

In Eq 13, $\eta=0$ is equivalent to moving the points according to the snake behavior as described for Method 2, as a function of edge normal, edge strength, smoothness, and continuity, while $\eta=1$ is equivalent to moving to a position consistent to the current estimated radial distortion.

Setting $\eta=1$ slows convergence of the snakes to the projected straight lines which they are trying to seek, in some cases the snakes may convergence to a wrong configuration. In general, $\eta$ may be time-varying, for example, starting with $\eta=0$ and gradually increasing $\eta$ to 1. In the preferred embodiment, the time-varying value of $\eta$ is a linear function from 0 to 1 over the selected number of iterations.

Results

Table A gives a comparison of radial distortion parameters $\kappa_1$ and $\kappa_2$ for the three calibration methods used on a real image of the office scene shown in FIGS. 2, 4, and 7.

TABLE A

| Method | $\kappa_1$ | $\kappa_2$ |
|---|---|---|
| Individual Points | $2.93 \times 10^{-7}$ | $7.10 \times 10^{-12}$ |
| Independent Snakes | $-5.30 \times 10^{-7}$ | $1.58 \times 10^{-11}$ |
| Dependent Snakes | $5.47 \times 10^{-7}$ | $3.55 \times 10^{-12}$ |

Although there is a significant difference between the sets of radial distortion parameters, observed undistorted images are substantially similar. For some images, dependent radial distortion snakes appear to converge to a more optimal local minima than independent snakes for the same snake initialization, seemingly making dependent snakes more tolerant to errors in snake initialization, e.g., placement, by the user.

Comparison of Methods

Method 1 of manually picking discrete direct line points, as an advantage, is the simplest to implement and understand. However, this method is more burdensome to the user since points should be carefully selected. This is because the user-designated input locations are used directly in the radial distortion parameter estimation step. It is possible to add the intermediate process of automatic local edge searching and location refinement, as described for FIG. 5, but this may be a problem in an image of a complicated scene with many local edges.

Of the two snake methods, dependent (radial distortion) snakes give better results. It can be observed that radial distortion snakes find best adaptation according to best global fit to radial distortion parameters. Radial distortion snakes appear to have fewer false local minima in comparison to independent snakes, and are less prone to being trapped in bad local minima. At every step of Method 3, the radial distortion snakes act together to give an optimal estimate of the global radial distortion parameters and deform in a consistent manner in approaching edges in the image. In comparison, each snake of Method 2 is locally adaptive and is independent of all the other snakes in the same image. The independent snakes are not specialized.

Summary

Described are three methods for recovering radial distortion parameters from a single image. All the methods rely on the user indicating the edges of projected straight lines in space on the image. The first method requires good user point to point localization while the other two methods only requires approximate initial snake configurations.

In essence, all the methods use the selected lines to estimate the radial distortion parameters based on least-squares minimization technique. However, the last two methods automatically deform the snakes to adapt and align along to strong edges subject to regularization. In the second method, the snakes behave independently with internal smoothing constraints and external edge-seeking forces. In the third method, the radial distortion snakes behave coherently to external edge-seeking forces and more importantly, directly linked to the image radial distortion model. As a result, this method is more robust and accurate than the other two methods.

Having described a preferred embodiment of the invention, it will now become apparent to one skilled in the art that other embodiments incorporating its concepts may be used. It is felt therefore, that this embodiment should not be limited to the disclosed embodiment, but rather should be limited only by the spirit and the scope of the appended claims.

APPENDIX "A"

To find the radial distortion parameters $\kappa_j$'s given rotated coordinates, we minimize the objective function $$\varepsilon = \sum_{i=1}^{N_s} \sum_{j=1}^{N_{pts,i}} \omega_{ij} \left[ y_{ij} \left(1 + \sum_{l=1}^{L} \kappa_l R_{ij}^l\right) - h_i \right]^2 \quad (18)$$

where $N_s$ is the number of snakes, $R_{ij} = x_{ij}^2 + y_{ij}^2$ and $\omega_{ij}$ is the confidence weight associated with the jth point in the ith snake. In our work, $\omega_{ij}$ is equated to the edge strength at image location $(x_{ij}, y_{ij})$. We use the rotated versions in order to simplify the analysis of the objective function to a point where a direct closed form solution is possible. Taking the partial derivatives with respect to the unknown parameters and equating them to zero, we get $$\frac{\partial \varepsilon}{\partial h_m} = 0 \Rightarrow h_m = \frac{1}{\sum_{j=1}^{N_{pts,m}} \omega_{mj}} \sum_{j=1}^{N_{pts,m}} \omega_{mj} y_{mj} \left(1 + \sum_{l=1}^{L} \kappa_l R_{mj}^l\right) \quad (19)$$

for m=1, ..., $N_s$, and $$\frac{\partial \varepsilon}{\partial \kappa_n} = 2 \sum_{i=1}^{N_s} \sum_{j=1}^{N_{pts,i}} \omega_{ij} \left[ y_{ij}\left(1 + \sum_{l=1}^{L} \kappa_l R_{ij}^l\right) - h_i \right] y_{ij} R_{ij}^n = 0 \quad (20)$$

for n=1, ... L, which yields $$\sum_{i=1}^{N_s} \sum_{j=1}^{N_{pts,i}} \omega_{ij} y_{ij}^2 R_{ij}^n \left(1 + \sum_{l=1}^{L} \kappa_l R_{ij}^l\right) = \sum_{i=1}^{N_s} h_i \sum_{j=1}^{N_{pts,i}} \omega_{ij} y_{ij} R_{ij}^n \quad (21)$$

letting $$A_n = \sum_{i=1}^{N_s} \sum_{j=1}^{N_{pts,i}} \omega_{ij} y_{ij}^2 R_{ij}^n \quad (22)$$

and rearranging the summation in the LHS of (21), we get $$LHS = A_n + \sum_{l=1}^{L} \kappa_l \sum_{i=1}^{N_s} \sum_{j=1}^{N_{pts,i}} \omega_{ij} y_{ij}^2 R_{ij}^{l+n} \quad (23)$$

$$= A_n + \sum_{l=1}^{L} \kappa_l A_{l+n}$$

As for the RHS of (21), substituting for $h_i$ from (19) and changing the summation subscript in the last summation term to avoid confusion, we get $$RHS = \sum_{i=1}^{N_s} \frac{1}{\sum_{j=1}^{N_{pts,i}} \omega_{ij}} \sum_{j=1}^{N_{pts,i}} \omega_{ij} y_{ij} \left(1 + \sum_{l=1}^{L} \kappa_l R_{ij}^l\right) \sum_{J=1}^{N_{pts,i}} \omega_{iJ} y_{iJ} R_{iJ}^n \quad (24)$$

$$= \sum_{i=1}^{N_s} \left( \overline{y}_i + \frac{1}{\sum_{j=1}^{N_{pts,i}} \omega_{ij}} \sum_{j=1}^{N_{pts,i}} \sum_{l=1}^{L} \kappa_l \omega_{ij} y_{ij} R_{ij}^l \right) \sum_{J=1}^{N_{pts,i}} \omega_{iJ} y_{iJ} R_{iJ}^n$$

$$= \sum_{i=1}^{N_s} \left( \overline{y}_i \sum_{J=1}^{N_{pts,i}} \omega_{iJ} y_{iJ} R_{iJ}^n + \right.$$

$$\left. \frac{1}{\sum_{j=1}^{N_{pts,i}} \omega_{ij}} \sum_{l=1}^{L} \kappa_l \sum_{j=1}^{N_{pts,i}} \omega_{ij} y_{ij} R_{ij}^l \sum_{J=1}^{N_{pts,i}} \omega_{iJ} y_{iJ} R_{iJ}^n \right)$$

$$= \sum_{i=1}^{N_s} \overline{y}_i \sum_{J=1}^{N_{pts,i}} \omega_{iJ} y_{iJ} R_{iJ}^n +$$

$$\sum_{l=1}^{L} \kappa_l \sum_{i=1}^{N_s} \frac{1}{\sum_{j=1}^{N_{pts,i}} \omega_{ij}} \sum_{j=1}^{N_{pts,i}} \omega_{ij} y_{ij} R_{ij}^l \sum_{J=1}^{N_{pts,i}} \omega_{iJ} y_{iJ} R_{iJ}^n$$

$$= C_n + \sum_{l=1}^{L} \kappa_l D_{ln}$$

for n=1, ..., L.

From (23) and (24), after rearranging, we get $$\sum_{l=1}^{L} \kappa_l (A_{l+n} - D_{ln}) = C_n - A_n \quad (25)$$

for n=1, ..., L, which is a linear system of equations that can be easily solved for $\kappa_n$'s. For the special case where only one radial distortion coefficient is sufficient, $$\kappa_1 = \frac{C_1 - A_1}{A_2 - D_{11}} \quad (26)$$

For the case of two radial distortion coefficients, $$\begin{pmatrix} \kappa_1 \\ \kappa_2 \end{pmatrix} = \begin{pmatrix} (A_2 - D_{11}) & (A_3 - D_{21}) \\ (A_3 - D_{12}) & (A_4 - D_{22}) \end{pmatrix}^{-1} \begin{pmatrix} (C_1 - A_1) \\ (C_2 - A_2) \end{pmatrix} \quad (27)$$

For L>1, we estimate the $\kappa$'s in succession. In other words, we first estimate $\kappa_1$, followed by $\kappa_1$ and $\kappa_2$, and so on, up til the last stage where we estimate all the radial distortion parameters $\kappa_1, \ldots \kappa_L$.

I claim:

1. A computerized method for recovering a set of radial distortion parameters from a single image of a scene taken by a camera:

selecting arbitrarily oriented lines in a projected image of said scene using an input device, said lines corresponding to features that are known to be linear in said scene; and minimizing objective functions describing the lines using a least-squares fit formulation to recover the set of radial distortion parameters;

wherein the lines are selected by drawn snakes, the single image is blurred before minimizing the objective functions and the method further comprises the steps of determining a nearest detectable edge for each snake, moving the snakes to follow the nearest detected edge, and then determining least squares fit for the moved snakes, the movement of the snakes depending upon each other and being subject to a global radial distortion constraint.

2. The method of claim 1 wherein the objective functions describing the lines are expressed in radial form, and further including the steps of converting the objective functions to Cartesian form, determining a least-squares fit for the lines, and;

converting the least-squared fit to radial form to recover the radial distortion parameters.

3. A computerized method for recovering a set of radial distortion parameters from a single image of a scene taken by a camera:

selecting arbitrarily oriented lines in a projected image of said scene using an input device, said lines corresponding to features that are known to be linear in said scene; and minimizing objective functions describing the lines using a least-squares fit formulation to recover the set of radial distortion parameters;

wherein the lines are selected by drawn snakes, the single image is blurred before minimizing the objective functions, and the method further comprises the steps of determining a nearest detectable edge for each snake, moving the snakes to follow the nearest detected edge, and then determining least squares fit for the moved snakes, the magnitude of the movement of the snakes being inversely proportional to a local intensity gradient of the nearest detected edge.

4. A computerized method for recovering a set of radial distortion parameters from a single image of a scene taken by a camera:

selecting arbitrarily oriented lines in a projected image of said scene using an input device, said lines corresponding to features that are known to be linear in said scene; and minimizing objective functions describing the lines using a least-squares fit formulation to recover the set of radial distortion parameters;

wherein the lines are selected by drawn snakes, the single image is blurred before minimizing the objective functions, and the method further comprises the steps of determining a nearest detectable edge for each snake, moving the snakes to follow the nearest detected edge, and then determining least squares fit for the moved snakes, the movement of each snake being independent of any other snake, the snakes being rotated about a principle point of the image to eliminate a coefficient.

* * * * *